US012401116B2

(12) United States Patent
Xu et al.

(10) Patent No.: US 12,401,116 B2
(45) Date of Patent: Aug. 26, 2025

(54) ELECTRONIC DEVICE WITH MULTI-FEED ANTENNA STRUCTURES

(71) Applicant: Apple Inc., Cupertino, CA (US)

(72) Inventors: Yuancheng Xu, San Jose, CA (US); Enrique Ayala Vazquez, Watsonville, CA (US); Nikolaj P Kammersgaard, Copenhagen (DK); Yiren Wang, Cupertino, CA (US); Yuan Tao, Santa Clara, CA (US); Han Wang, Campbell, CA (US); Haozhan Tian, San Jose, CA (US); Hao Xu, Cupertino, CA (US); Hongfei Hu, Cupertino, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 18/458,949

(22) Filed: Aug. 30, 2023

(65) Prior Publication Data

US 2024/0079766 A1 Mar. 7, 2024

Related U.S. Application Data

(60) Provisional application No. 63/403,977, filed on Sep. 6, 2022.

(51) Int. Cl.

*H01Q 1/38* (2006.01)
*H01Q 1/50* (2006.01)
*H01Q 13/10* (2006.01)

(52) U.S. Cl.

CPC ................. *H01Q 1/38* (2013.01); *H01Q 1/50* (2013.01); *H01Q 13/10* (2013.01)

(58) Field of Classification Search

CPC ............ H01Q 1/38; H01Q 1/50; H01Q 13/10; H01Q 5/328; H01Q 5/335; H01Q 9/42; H01Q 1/243

See application file for complete search history.

(56) References Cited

U.S. PATENT DOCUMENTS

| | | | | |
|---|---|---|---|---|
| 9,912,040 | B2 * | 3/2018 | Irci | H01Q 1/243 |
| 10,886,614 | B2 | 1/2021 | Lee et al. | |
| 11,901,641 | B2 * | 2/2024 | Vazquez | H01Q 9/42 |

(Continued)

FOREIGN PATENT DOCUMENTS

KR 102306080 B1 * 9/2021

*Primary Examiner* — Seung H Lee

(74) *Attorney, Agent, or Firm* — Treyz Law Group, P.C.; Michael H. Lyons

(57) ABSTRACT

An electronic device may be provided with peripheral conductive housing structures having a first segment and a second segment. First and second antenna feeds may be coupled between the first segment and the ground structures. The first feed may convey signals in a first band and the second feed may convey signals in a second band. The first segment may be near-field coupled to a slot between the second segment and the ground structures. A first tuner may be coupled between the second segment and the ground structures and may adjust a resonance of the first segment in the first and second bands. A second tuner coupled to the first feed may perform impedance matching in the first band and aperture tuning in the second band. A third tuner coupled to the second feed may perform impedance matching in the second band and aperture tuning in the first band.

20 Claims, 8 Drawing Sheets

(56) References Cited

U.S. PATENT DOCUMENTS

| | | | | |
|---|---|---|---|---|
| 2021/0075089 | A1 | 3/2021 | Chang et al. | |
| 2022/0069445 | A1 | 3/2022 | Ha et al. | |
| 2022/0069468 | A1 * | 3/2022 | Hsu | H01Q 5/20 |

* cited by examiner

ELECTRONIC DEVICE WITH MULTI-FEED ANTENNA STRUCTURES

This application claims the benefit of U.S. Provisional Patent Application No. 63/403,977, filed Sep. 6, 2022, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing having peripheral conductive housing structures. A dielectric-filled gap may divide the peripheral conductive housing structures into a first segment and a second segment. A first antenna feed may be coupled between the first segment and ground structures. A second antenna feed may be coupled between the first segment and the ground structures. The first antenna feed may convey radio-frequency signals in a first frequency band. The second antenna feed may convey radio-frequency signals in a second frequency band.

The first segment may be near-field coupled to a slot between the second segment and the ground structures in the first and second frequency bands. A first tuner may be coupled between the second segment and the ground structures across the slot. The first tuner may adjust a resonance of the first segment in the first and second frequency bands. If desired, the first tuner may also perform impedance matching for a third antenna feed coupled between the second segment and the ground structures across the slot.

A second tuner may be coupled to the first antenna feed. A third tuner may be coupled to the second antenna feed. The second tuner may perform impedance matching in the first frequency band for the first antenna. The second tuner may also perform aperture tuning in the second frequency band for the second antenna. The third tuner may perform impedance matching in the second frequency band for the second antenna. The third tuner may also perform aperture tuning in the first frequency band for the first antenna.

DETAILED DESCRIPTION

Figure 1:
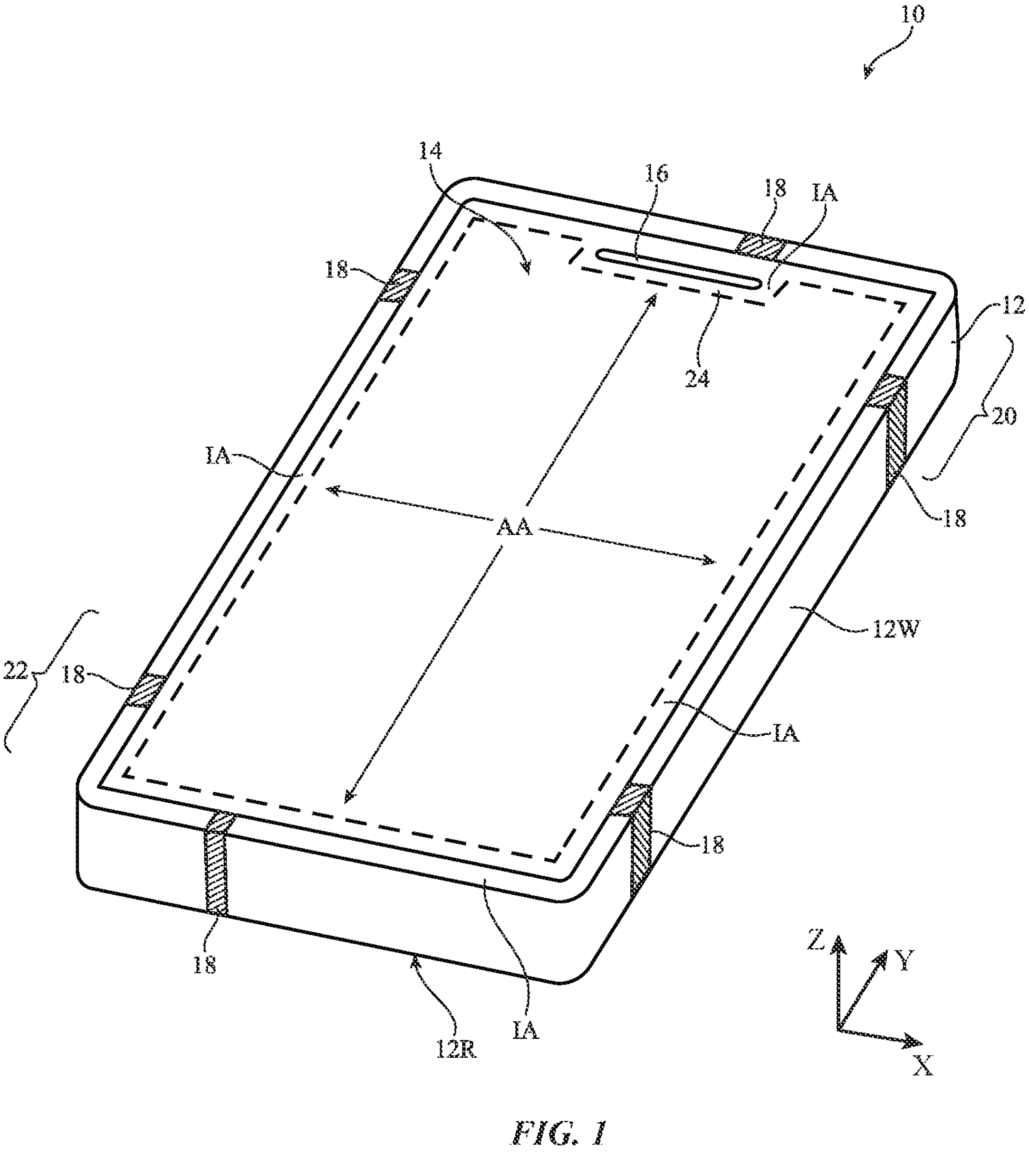
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
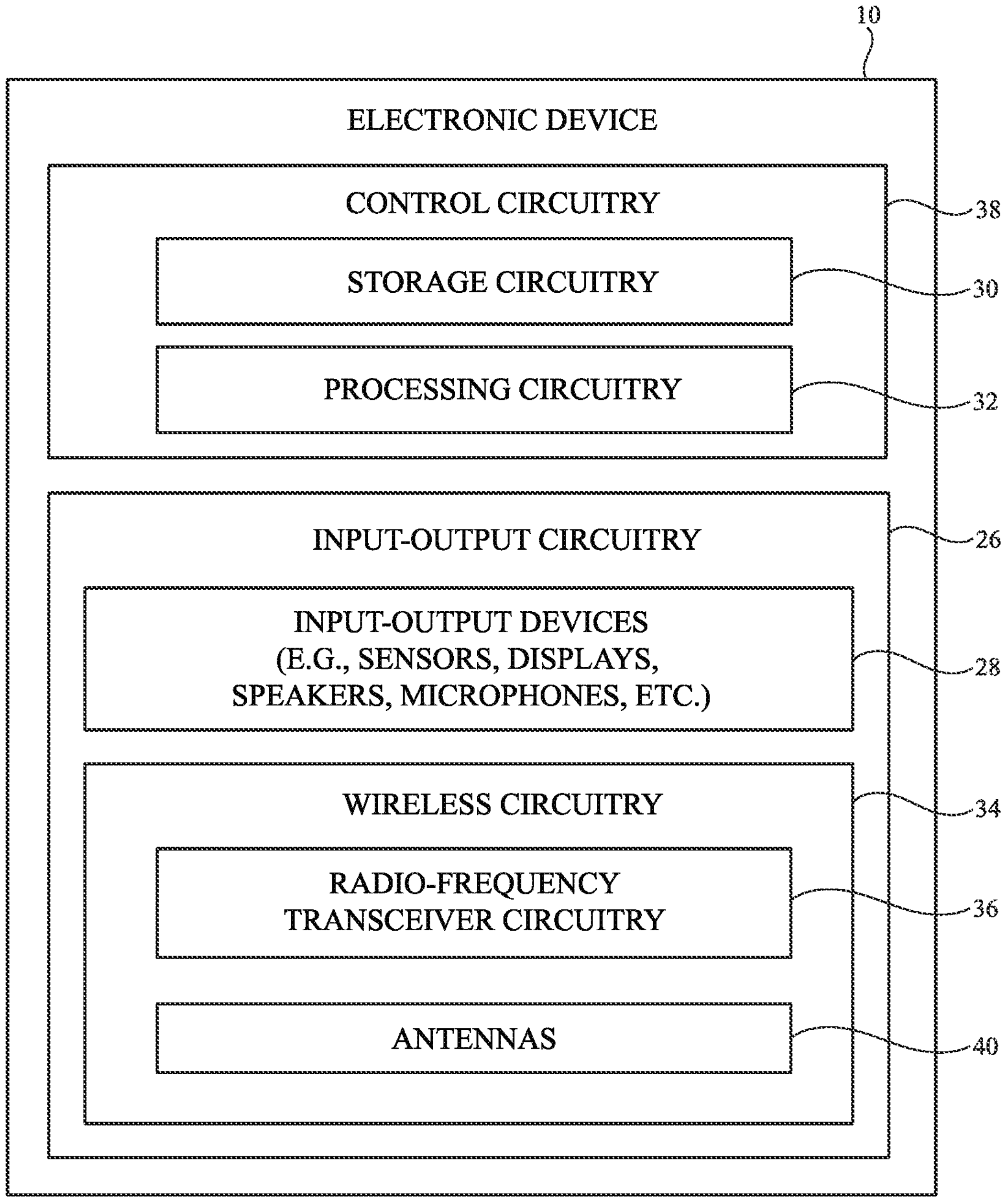
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
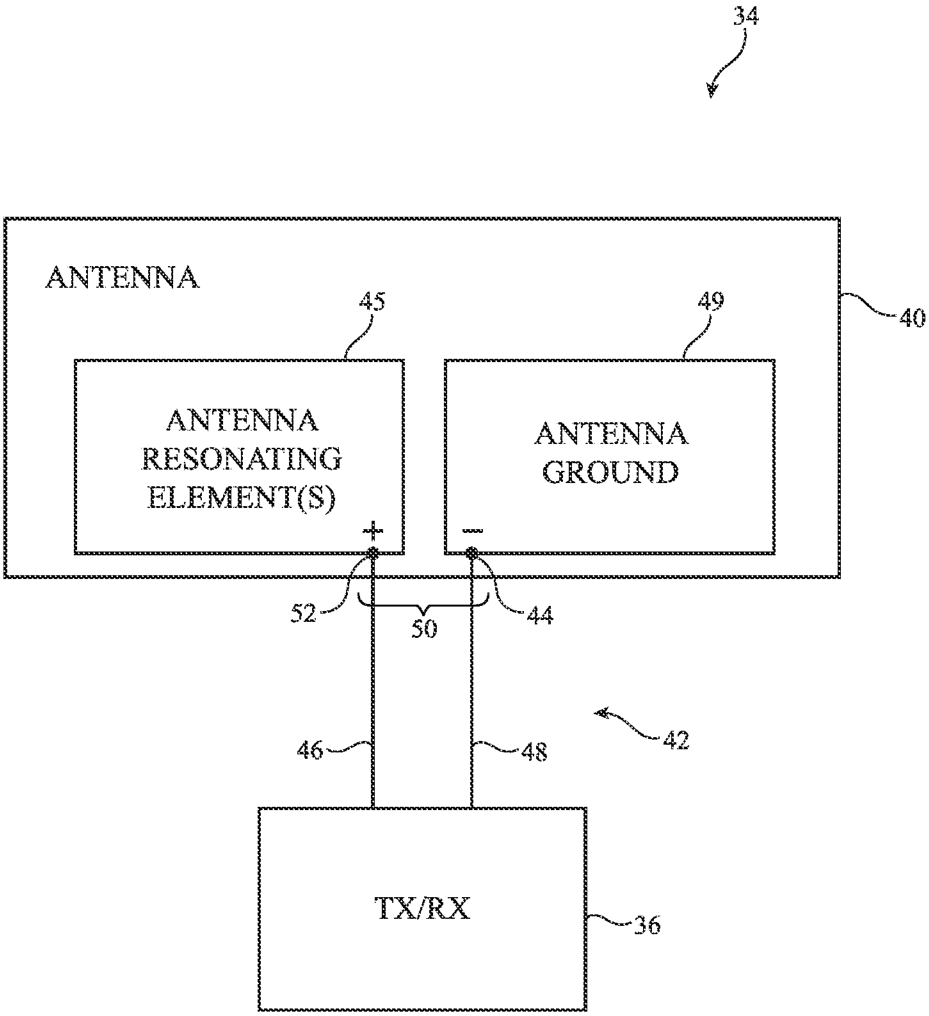
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
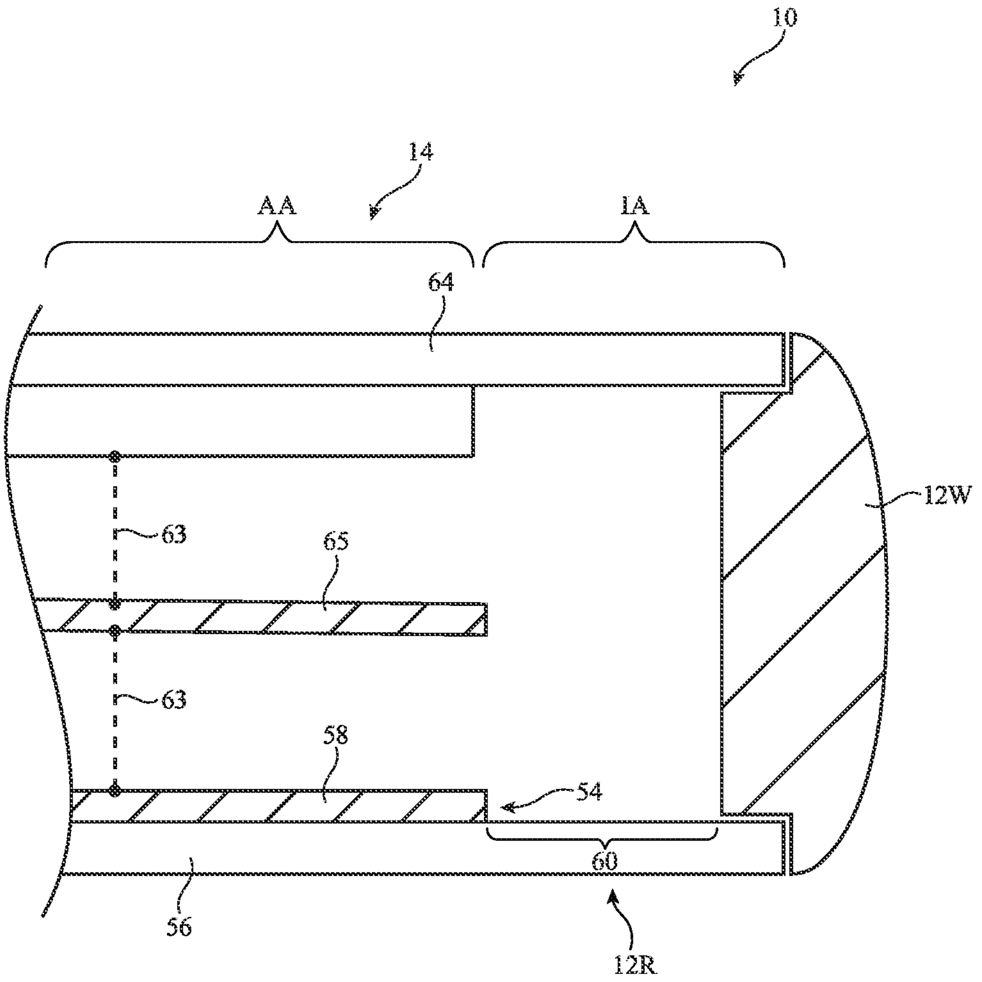
FIG. 4 is a cross-sectional side view of an illustrative electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
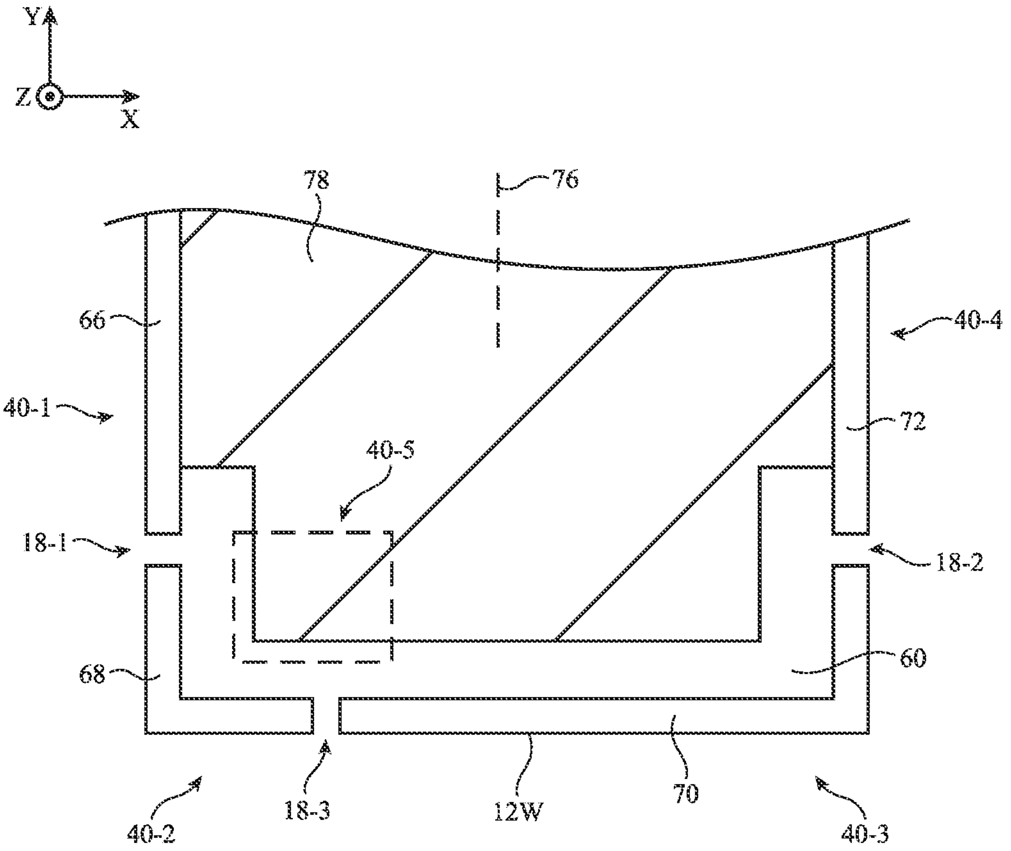
FIG. 5 is an interior front view of the lower end of an illustrative electronic device having peripheral conductive housing structures with dielectric gaps for forming at least first and second antennas in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as conductive support plate 58 (FIG. 4), mid-chassis 65 (FIG. 4), conductive display structures, conductive interconnect structures 63 (FIG. 4), conductive traces on a printed circuit board, conductive portions of one or more components in device 10, etc. Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include a first antenna 40-1 having an antenna resonating (radiating) element formed from segment 66, segment 68, and/or a portion of slot 60 (e.g., a vertically extending end of slot 60 that extends parallel to longitudinal axis 76 and past gap 18-1, between segment 66 and ground structures 78) and having an antenna ground formed from ground structures 78. Device 10 may also include a second antenna 40-2 having an antenna resonating element formed from segment 68, segment 66, and/or a portion of slot 60 and having an antenna ground formed from ground structures 78. Device 10 may also include a third antenna 40-3 having an antenna resonating element (e.g., a resonating element arm) formed from segment 70 and having an antenna ground formed from ground structures 78. Device 10 may also include a fourth antenna 40-4 having a slot antenna resonating element formed from segment 72 and/or a portion of slot 60 between segment 72 and ground structures 78. Antennas 40-2 and 40-3 may be, for example, inverted-F antennas having return paths that couples the respective resonating element arms to the antenna ground. If desired, device 10 may also include a fifth antenna 40-5 at least partially overlapping the volume of antenna 40-2. Fifth antenna 40-5 may include an antenna resonating element arm formed from conductive traces on a flexible printed circuit and may have an antenna ground formed from ground structures 78. Antennas 40-1, 40-2, 40-3, 40-4, and 40-5 may convey radio-frequency signals in one or more frequency bands (e.g., using MIMO communications in one or more of bands, thereby maximizing data throughput).

Figure 6:
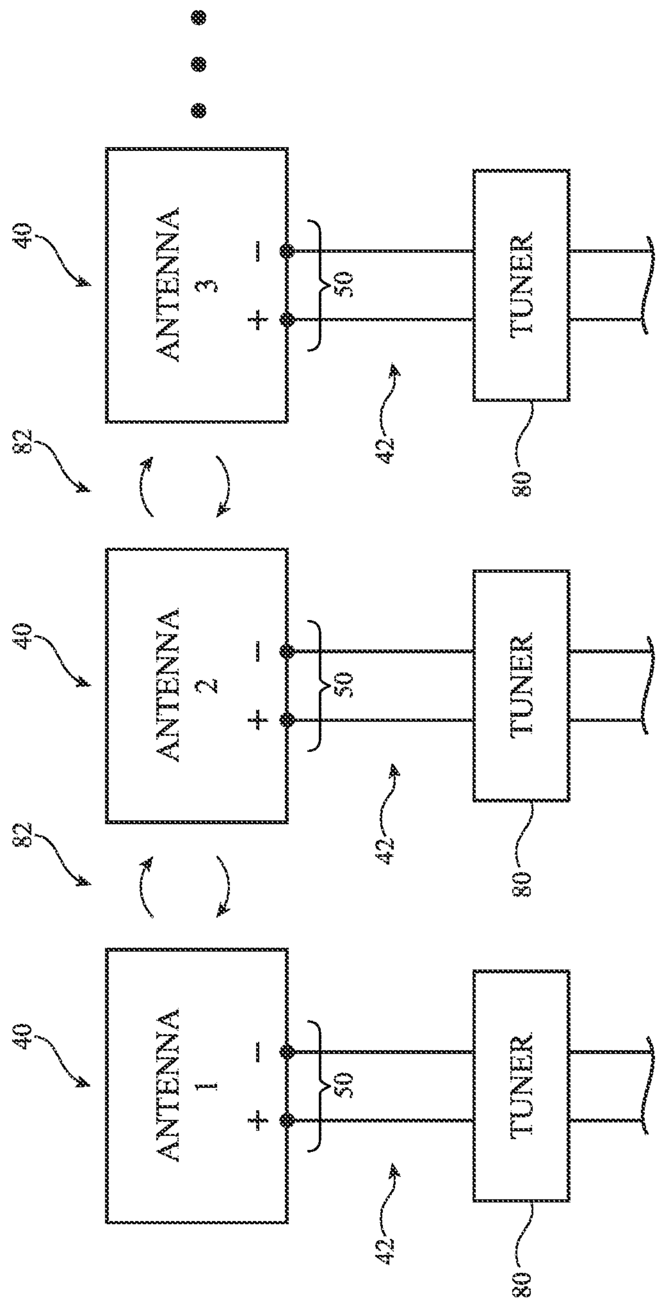
FIG. 6 is a schematic diagram showing how conductive structures in an antenna may be near-field coupled to conductive structures in one or more other antennas for optimizing performance of the antennas in accordance with some embodiments.

It may be desirable for each antenna 40 to cover as many frequency bands as possible (thereby maximizing the wireless capability of device 10) in as small a volume as possible (thereby minimizing the size of device 10). In practice, conductive structures in a given antenna 40 (e.g., antenna resonating element 45 and/or antenna ground 49 of FIG. 3) may be used to boost the wireless performance of an adjacent antenna 40 via near-field (NF) electromagnetic coupling. FIG. 6 is a diagram showing how an antenna 40 may be used to boost the wireless performance of one or more adjacent antennas 40.

As shown in FIG. 6, device 10 may include multiple antennas 40. Each antenna 40 may be fed using a respective antenna feed 50. Each antenna 40 may be fed by a transmission line path 42 coupled to its antenna feed 50. Each antenna 40 may have a frequency response that is tuned or adjusted by a respective tuner 80 disposed on its transmission line path 42. Tuner 80 may, for example, perform impedance matching and/or aperture tuning for its antenna 40.

At the same time, a given antenna 40 may have conductive structures (e.g., antenna resonating element 45 and/or antenna ground 49 of FIG. 3) that are wirelessly coupled to conductive structures in one, two, or more than two nearby (e.g., adjacent) antennas 40 via near-field electromagnetic coupling(s) 82. Near-field electromagnetic coupling(s) 82 may allow a given antenna 40 to boost the response (e.g., increase antenna efficiency) in one or more frequency bands for the adjacent antenna(s) 40. This may, for example serve, to increase the bandwidth of the adjacent antenna(s) 40 (e.g., by increasing the range of frequencies over which the adjacent antenna(s) 40 exhibit an antenna efficiency that exceeds a threshold value). Conversely, near-field electromagnetic coupling(s) 82 may allow a given antenna 40 to have its own response boosted across one or more frequency bands by the presence of the conductive structures in the adjacent antenna(s) 40.

If desired, two or more antennas 40 may share conductive structures. For example, the antenna resonating element 45 (FIG. 3) of a first antenna 40 may include one or more of the same (shared) conductive structures of the antenna resonating element 45 of a second antenna 40 (e.g., the antenna feed 50 for both the first and second antennas may be coupled to the same conductive structure(s)). Sharing conductive structures between the antenna resonating element 45 of a given antenna 40 and one or more adjacent antenna(s) 40 and/or near-field electromagnetic coupling(s) 82 may allow the tuner 80 of a given antenna 40 to also tune the frequency response of one or more adjacent antenna(s) 40. In other words, tuner 80 may effectively boost the antenna efficiency and/or bandwidth of its own corresponding antenna 40 in a first frequency band (or set of frequency bands) covered by that antenna 40 while concurrently boosting the antenna efficiency and/or bandwidth of one or more adjacent antenna (s) 40 in a second frequency band (or set of frequency bands) covered by the one or more adjacent antenna(s) 40.

For example, the tuner 80 interposed on the transmission line path 42 of a first antenna 40 may perform impedance matching for first antenna 40. In other words, the tuner may form impedance matching circuitry for the first antenna that serves to match an impedance of transmission line path 42 to the impedance of first antenna 40 in a first set of frequency bands handled by the first antenna. Tuner 80 may also concurrently perform aperture tuning for a second antenna 40 adjacent to the first antenna. In other words, the tuner may form an aperture tuner for the second antenna, which serves to tune a frequency response of the second antenna in a second set of frequency bands handled by the second antenna. The second antenna 40 and the first antenna 40 may both include antenna resonating elements formed from one or more of the same (shared) conductive structures, such as the same segment of peripheral conductive housing structures 12W and/or the same portion of slot 60 (FIG. 5).

Tuners 80 may each include one or more tuning components (e.g., tuning elements or tuning circuits). The tuning components may include one or more fixed or adjustable capacitors, inductors, and/or resistors, switching circuitry (e.g., one or more switches), one or more filters, one or more radio-frequency couplers, and/or any other desired tuning components coupled in any desired manner between terminals of the tuner. The tuning components may, if desired, be covered with an encapsulation layer or cap and/or an electromagnetic shield. The tuning components may be mounted to an underlying substrate such as a flexible printed circuit.

Figure 7:
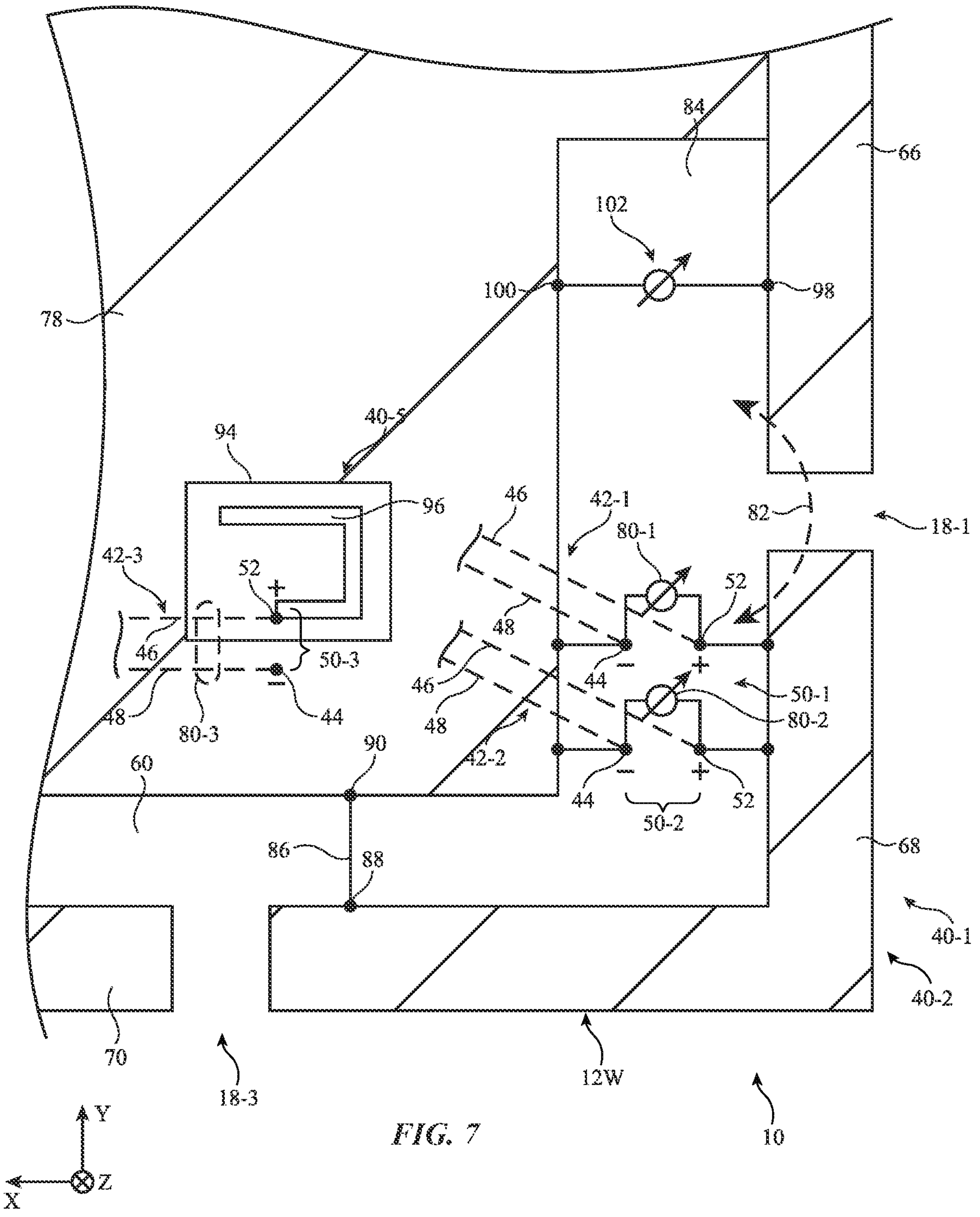
FIG. 7 is an interior rear view of first and second antennas that share near-field coupled conductive structures in accordance with some embodiments.

FIG. 7 is an interior rear view showing how antennas 40-2 and 40-1 may both include antenna resonating elements formed from one or more of the same (shared) conductive structures. Rear housing wall 12R (FIG. 4) and other components in device 10 have been omitted from the view shown in FIG. 7 for the sake of clarity.

As shown in FIG. 7, antenna 40-1 and antenna 40-2 may both have an antenna resonating element arm (e.g., antenna resonating element 45 of FIG. 3) formed from segment 68 of peripheral conductive housing structures 12W. Antennas 40-1 and 40-2 may also share ground structures 78. Antennas 40-1 and 40-2 may include a return path 86 coupled between terminal 88 on segment 68 (e.g., at or adjacent to gap 18-3) and terminal 90 on ground structures 78. If desired, a tuning component for antenna 40-1 and/or 40-2 may be disposed on return path 86.

Antenna 40-1 may be fed using a first antenna feed 50-1 coupled across slot 60. Antenna feed 50-1 may have a positive antenna feed terminal 52 coupled to a first location on segment 68 and may have a ground antenna feed terminal 44 coupled to ground structures 78. Antenna 40-2 may be fed using a first antenna feed 50-2 coupled across slot 60. Antenna feed 50-2 may have a positive antenna feed terminal 52 coupled to a second location on segment 68 and may have a ground antenna feed terminal 44 coupled to ground structures 78. The first location on segment 68 (e.g., positive antenna feed terminal 52 of antenna feed 50-1) may be interposed between gap 18-1 and the second location on segment 68 (e.g., positive antenna feed terminal 52 of antenna feed 50-2). In other words, antenna feed 50-1 may be interposed between gap 18-1 and antenna feed 50-2.

Antenna 40-1 may be fed by a first transmission line path 42-1 coupled to antenna feed 50-1. First transmission line path 42-1 may have a signal conductor 46 coupled to the positive antenna feed terminal 52 of antenna feed 50-1 and may have a ground conductor 48 coupled to the ground antenna feed terminal 44 of antenna feed 50-1. Antenna 40-2 may be fed by a second transmission line path 42-2 coupled to antenna feed 50-2. Second transmission line path 42-2 may have a signal conductor 46 coupled to the positive antenna feed terminal 52 of antenna feed 50-2 and may have a ground conductor 48 coupled to the ground antenna feed terminal 44 of antenna feed 50-2. Transmission line paths 42-1 and 42-2 may be coupled to one or more transceivers 36 (FIG. 3).

Antenna 40-1 may include a tuner 80-1 disposed on transmission line path 42-1 (e.g., having a first terminal coupled to the positive antenna feed terminal 52 and having a second terminal coupled to the ground antenna feed terminal 44 of antenna feed 50-1). Antenna 40-2 may include a tuner 80-2 disposed on transmission line path 42-2 (e.g., coupled between the positive antenna feed terminal 52 and the ground antenna feed terminal 44 of antenna feed 50-2). Tuners 80-1 and 80-2 may receive control signals that adjust the state of one or more tuning components in tuners 80-1 and 80-2 (e.g., to alter the frequency response of antenna 40-1 and/or antenna 40-2 as needed over time).

Slot 60 may include a vertical portion that extends parallel to longitudinal axis 76 of FIG. 5 (Y-axis of FIG. 7) and beyond gap 18-1. As shown in FIG. 7, slot 60 may include an extended (elongated) portion 84. Extended portion 84 of slot 60 may extend between segment 66 and ground structures 78 (e.g., segment 66 and ground structures 78 may define opposing edges of extended portion 84), parallel to the Y-axis. Extended portion 84 of slot 60 may have an open end at gap 18-1 and an opposing closed end formed from ground structures 78. Extended portion 84 of slot 60 may sometimes be referred to herein simply as slot 84.

The length of segment 68 may be selected to contribute to the radiative response (resonance) of antenna 40-1 in a first set of frequency bands while also contributing to the radiative response of antenna 40-2 in a second set of frequency bands (e.g., in a fundamental mode and/or one or more harmonic modes). The first set of frequency bands covered by antenna 40-1 may include the cellular UHB (e.g., frequencies between about 3400 MHz and 3600 MHz) whereas the second set of frequency bands covered by antenna 40-2 may include the cellular MB, the cellular HB, and the 2.4 GHz WLAN/WPAN band, for example.

Slot 84 may also contribute to the radiative response of antenna 40-1 in the first set of frequency bands as well as the radiative response of antenna 40-2 in the second set of frequency bands. If desired, slot 84 may form a slot antenna resonating element for both antennas 40-1 and 40-2. (FIG. 5). Slot 84 may be near-field coupled to the segment 68 (e.g., the radiating arm of both antennas 40-1 and 40-2) via near-field electromagnetic coupling 82. For example, antenna currents conveyed by antenna feed 50-1 in the first set of frequency bands and flowing on segment 68 may produce (induce), via near-field electromagnetic coupling 82, corresponding antenna currents that flow around the perimeter of slot 84 (e.g., ground structures 78 and segment 66). These antenna currents and thus slot 84 may be used to convey radio-frequency signals for antenna feed 50-1 and antenna 40-1 in the first set of frequency bands (e.g., slot 84 may contribute to the resonance of antenna 40-1). At the same time, antenna currents conveyed by antenna feed 50-2 in the second set of frequency bands and flowing on segment 68 may produce (induce), via near-field electromagnetic coupling 82, corresponding antenna currents that flow around the perimeter of slot 84 (e.g., ground structures 78 and segment 66). These antenna currents and thus slot 84 may be used to convey radio-frequency signals for antenna feed 50-1 and antenna 40-1 in the second set of frequency bands (e.g., slot 84 may contribute to the resonance of antenna 40-2).

Antennas 40-1 and 40-2 may also include a tuner 102 coupled between terminal 100 on ground structures 78 and terminal 98 on segment 66 across slot 84 (e.g., tuner 102 may bridge slot 84). Near-field coupling 82 may allow tuner 102 to adjust (tune) the radiative response of both antenna 40-1 (in the first set of frequency bands) and antenna 40-2 (in the second set of frequency bands). Tuner 102 may receive control signals that change the state of tuner 102 and thus the frequency response of antenna 40-1 and/or antenna 40-2. Tuner 102 may include one or more tuning components (e.g., tuning elements or tuning circuits). The tuning components may include one or more fixed or adjustable capacitors, inductors, and/or resistors, switching circuitry (e.g., one or more switches), one or more filters, one or more radio-frequency couplers, and/or any other desired tuning components coupled in any desired manner between terminals of the tuner. The tuning components may, if desired, be covered with an encapsulation layer or cap and/or an electromagnetic shield. The tuning components may be mounted to an underlying substrate such as a flexible printed circuit.

Tuner 80-1 of antenna 40-1 may contribute to the radiative response of both antennas 40-1 and 40-2. Tuner 80-1 may, for example, form impedance matching circuitry for antenna 40-1 that performs impedance matching in the first set of frequency bands between transmission line path 42-1 and segment 68. At the same time, tuner 80-1 may form an aperture tuner that tunes the frequency response of antenna 40-2 in the second set of frequency bands. The tuning components in tuner 80-1 may, for example, be selected to perform impedance matching in the first set of frequency bands while concurrently adjusting the impedance between segment 68 and ground structures 78 (across slot 60) in the second set of frequency bands for tuning antenna 40-2.

Similarly, tuner 80-2 of antenna 40-2 may contribute to the radiative response of both antennas 40-1 and 40-2. Tuner 80-2 may, for example, form impedance matching circuitry that performs impedance matching for antenna 40-2 in the second set of frequency bands between transmission line path 42-2 and segment 68. At the same time, tuner 80-2 may form an aperture tuner that tunes the frequency response of antenna 40-2 in the second set of frequency bands. The tuning components in tuner 80-2 may, for example, be selected to perform impedance matching in the second set of frequency bands while concurrently adjusting the impedance load between segment 68 and ground structures 78 (across slot 60) in the first set of frequency bands for tuning antenna 40-1. Tuners 80-1 and 80-2, tuner 102, slot 84, and the length of segment 68 may collectively configure the conductive structures in FIG. 7 (e.g., the antenna resonating element of antennas 40-1 and 40-2) to radiate and convey radio-frequency signals across a relatively wide frequency range that includes both the first and second sets of frequency bands (e.g., from 1.7-6 GHz), despite the small volume in device 10 occupied by antennas 40-1 and 40-2.

As shown in FIG. 7, antenna 40-5 may also be disposed in device 10 adjacent to antennas 40-1 and 40-2. Antenna 40-5 may have an antenna resonating element formed from conductive traces 96 (e.g., a resonating element arm) patterned on an underlying substrate such as substrate 94 (e.g., a flexible printed circuit board). Antenna 40-5 may be fed by antenna feed 50-3 having a positive antenna feed terminal 52 on conductive traces 96 and a ground antenna feed terminal 44 on ground structures 78. Antenna 40-5 may be fed by a transmission line path 42-3 having a signal conductor 46 coupled to positive antenna feed terminal 52 of antenna feed 50-3 and having a ground conductor 48 coupled to ground antenna feed terminal 44 of antenna feed 50-3. Antenna 40-5 may include a tuner 80-3 disposed on transmission line path 42-3 that adjusts a frequency response of antenna 40-5. Antenna 40-5 may convey radio-frequency signals in a 5 GHz WLAN band and/or cellular telephone bands around 5 GHz.

Figure 8:
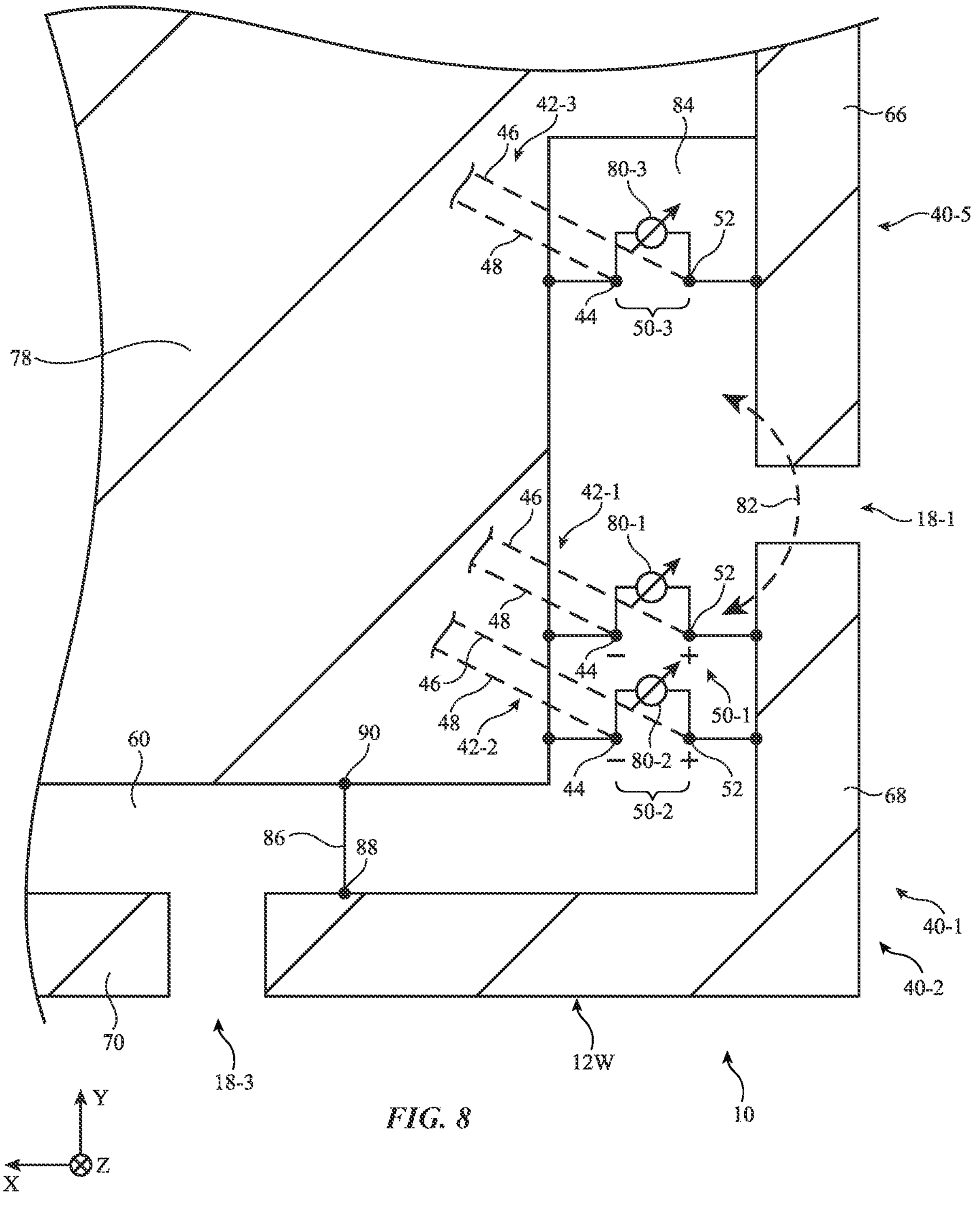
FIG. 8 is an interior rear view showing how a third antenna may be integrated into the conductive structures of first and second antennas of the type shown in FIG. 7 in accordance with some embodiments.

In the example of FIG. 7, tuner 80-3 of antenna 40-5 only tunes the frequency response of antenna 40-5 without tuning the frequency response of antennas 40-1 and 40-2. If desired, antenna 40-5 may have an antenna resonating element formed from segment 66 and slot 84 and tuner 80-3 may be used to tune the frequency response of antennas 40-1 and 40-2. FIG. 8 is a diagram showing how antenna 40-5 may have an antenna resonating element formed from segment 66 and slot 84 and tuner 80-3 may be used to tune the frequency response of antennas 40-1 and 40-2.

As shown in FIG. 8, antenna feed 50-3 may be coupled across slot 84. Positive antenna feed terminal 52 of antenna feed 50-3 may be coupled to segment 66. Ground antenna feed terminal 44 may be coupled to ground structures 78. Tuner 80-3 may be coupled between positive antenna feed terminal 52 and ground antenna feed terminal 44 of antenna feed 50-3. Segment 66 and slot 84 may form the antenna resonating element for antenna 40-5. Antenna feed 50-4 may convey antenna currents around the perimeter of slot 84 in the 5 GHz WLAN band and/or cellular telephone bands around 5 GHz.

Tuner 80-3 may perform impedance matching for antenna 40-5 and may tune the frequency response of antenna 40-5. At the same time, tuner 80-3 may tune the frequency response of antenna 40-1 and/or antenna 40-2 via near-field electromagnetic coupling 82 and/or by adjusting the impedance across slot 84 for antenna current in the first set of frequency bands (e.g., for antenna 40-1) and/or for antenna current in the second set of frequency bands (e.g., for antenna 40-2). The examples of FIGS. 7 and 8 are merely illustrative. Segment 68 and slot 84 may have other shapes (e.g., having any desired number of curved and/or straight segments or portions). Additional tuners may be coupled to segment 68 and/or segment 66. Segment 66, segment 68, slot 84, ground structures 78, return path 86, tuners 80-1, 80-2, and 80-3, and/or antenna feeds 50-1, 50-2, and 50-3 may sometimes be referred to collectively herein as conductive structures, conductive antenna structures, or antenna structures.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

ground structures;

peripheral conductive housing structures having a dielectric-filled gap that divides the peripheral conductive housing structures into a first segment and a second segment, wherein the first segment is separated from the ground structures by a slot and the second segment is separated from the ground structures by a portion of the slot extending beyond the dielectric-filled gap;

a first antenna feed coupled between the ground structures and a first location on the first segment across the slot, wherein the first antenna feed is configured to convey first radio-frequency signals in a first frequency band, the first segment and the portion of the slot being configured to radiate in the first frequency band; and a second antenna feed coupled between the ground structures and a second location on the first segment across the slot, wherein the second antenna feed is configured to convey second radio-frequency signals in a second frequency band different than the first frequency band, the first segment and the portion of the slot being configured to radiate in the second frequency band.

2. The electronic device of claim 1, wherein the first segment is near-field coupled to the portion of the slot in the first frequency band.

3. The electronic device of claim 2, wherein the first segment is near-field coupled to the portion of the slot in the second frequency band.

4. The electronic device of claim 1, further comprising:

a tuner coupled between the second segment and the ground structures across the portion of the slot.

5. The electronic device of claim 4, wherein the tuner is configured to adjust the first frequency band and the second frequency band.

6. The electronic device of claim 1, further comprising:

a first transmission line path coupled to the first antenna feed;

a first tuner disposed on the first transmission line path;

a second transmission line path coupled to the second antenna feed; and a second tuner disposed on the second transmission line path.

7. The electronic device of claim 6, wherein the first tuner is configured to impedance match the first transmission line path to the first segment in the first frequency band and the second tuner is configured to impedance match the second transmission line path to the first segment in the second frequency band.

8. The electronic device of claim 7, wherein the first tuner is further configured to adjust the second frequency band and the second tuner is further configured to adjust the first frequency band.

9. The electronic device of claim 8, further comprising a third tuner coupled between the second segment and the ground structures across the portion of the slot.

10. The electronic device of claim 1, further comprising a return path that couples a third location on the first segment to the ground structures, the second location being interposed on the first segment between the third location and the first location.

11. An electronic device comprising:

ground structures;

peripheral conductive housing structures having a segment extending from a first dielectric-filled gap to a second dielectric-filled gap;

a first antenna feed terminal coupled to a first location on the segment;

a second antenna feed terminal coupled to the ground structures;

a third antenna feed terminal coupled to a second location on the segment;

a fourth antenna feed terminal coupled to the ground structures;

a first transmission line path coupled to the first and second antenna feed terminals;

a second transmission line path coupled to the third and fourth antenna feed terminals;

a first tuner disposed on the first transmission line path, wherein the first tuner is configured to match an impedance of the first transmission line path to an impedance of the segment in a first frequency band; and a second tuner disposed on the second transmission line path, wherein the second tuner is configured to match an impedance of the second transmission line path to the impedance of the segment in a second frequency band different from the first frequency band, the second tuner being further configured to tune a resonance of the segment in the first frequency band.

12. The electronic device of claim 11, wherein the first tuner is further configured to tune a resonance of the segment in the second frequency band.

13. The electronic device of claim 12, wherein the peripheral conductive housing structures comprise an additional segment separated from the segment by the first dielectric-filled gap, the additional segment is separated from the ground structures by a slot, and the slot is near-field coupled to the segment in the first frequency band and in the second frequency band.

14. The electronic device of claim 13, further comprising:

a third tuner coupled between the ground structures and the additional segment across the slot, the third tuner being configured to tune the resonance of the segment in the first frequency band and the resonance of the segment in the second frequency band.

15. The electronic device of claim 13, further comprising:

a fifth antenna feed terminal coupled to the additional segment;

a sixth antenna feed terminal coupled to the ground structures;

a third transmission line path coupled to the fifth and sixth antenna feed terminals; and a third tuner disposed on the third transmission line path, wherein the third tuner is configured to match an impedance of the third transmission line path to an impedance of the additional segment in a third frequency band different from the first and second frequency bands, the third tuner being further configured to tune the resonance of the segment in the first frequency band and the resonance of the segment in the second frequency band.

16. The electronic device of claim 11, wherein the first tuner has a first terminal coupled to the first antenna feed terminal and has a second terminal coupled to the second antenna feed terminal and wherein the second tuner has a third terminal coupled to the third antenna feed terminal and has a fourth terminal coupled to the fourth antenna feed terminal.

17. The electronic device of claim 11, further comprising:

a return path that couples a third location on the segment to the ground structures, the second location being interposed on the segment between the first location and the third location.

18. An electronic device comprising:

peripheral conductive housing structures having a dielectric-filled gap that divides the peripheral conductive housing structures into a first segment and a second segment;

ground structures separated from the first segment by a first slot and separated from the second segment by a second slot extending from the first slot;

a first antenna feed coupled between the first segment and the ground structures across the first slot;

a second antenna feed coupled between the second segment and the ground structures across the second slot, the second antenna feed being configured to excite a resonance of the second segment in a first frequency band;

a third antenna feed coupled between the second segment and the ground structures across the second slot, the third antenna feed being configured to excite a resonance of the second segment in a second frequency band different than the first frequency band; and a tuner coupled to the first antenna feed, wherein the tuner is configured to adjust the resonance of the segment in the first frequency band.

19. The electronic device of claim 18, wherein the tuner is configured to impedance match the third antenna feed in a third frequency band that is different from the first frequency band and the second frequency band.

20. The electronic device of claim 18, wherein the tuner is configured to adjust the resonance of the segment in the second frequency band.

* * * * *